Figure 13:
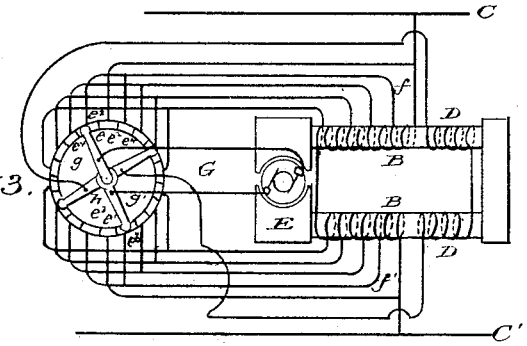

(No Model.) 3 Sheets—Sheet 1.
F. J. SPRAGUE.
ELECTRO DYNAMIC MOTOR.
No. 315,179. Patented Apr. 7, 1885.
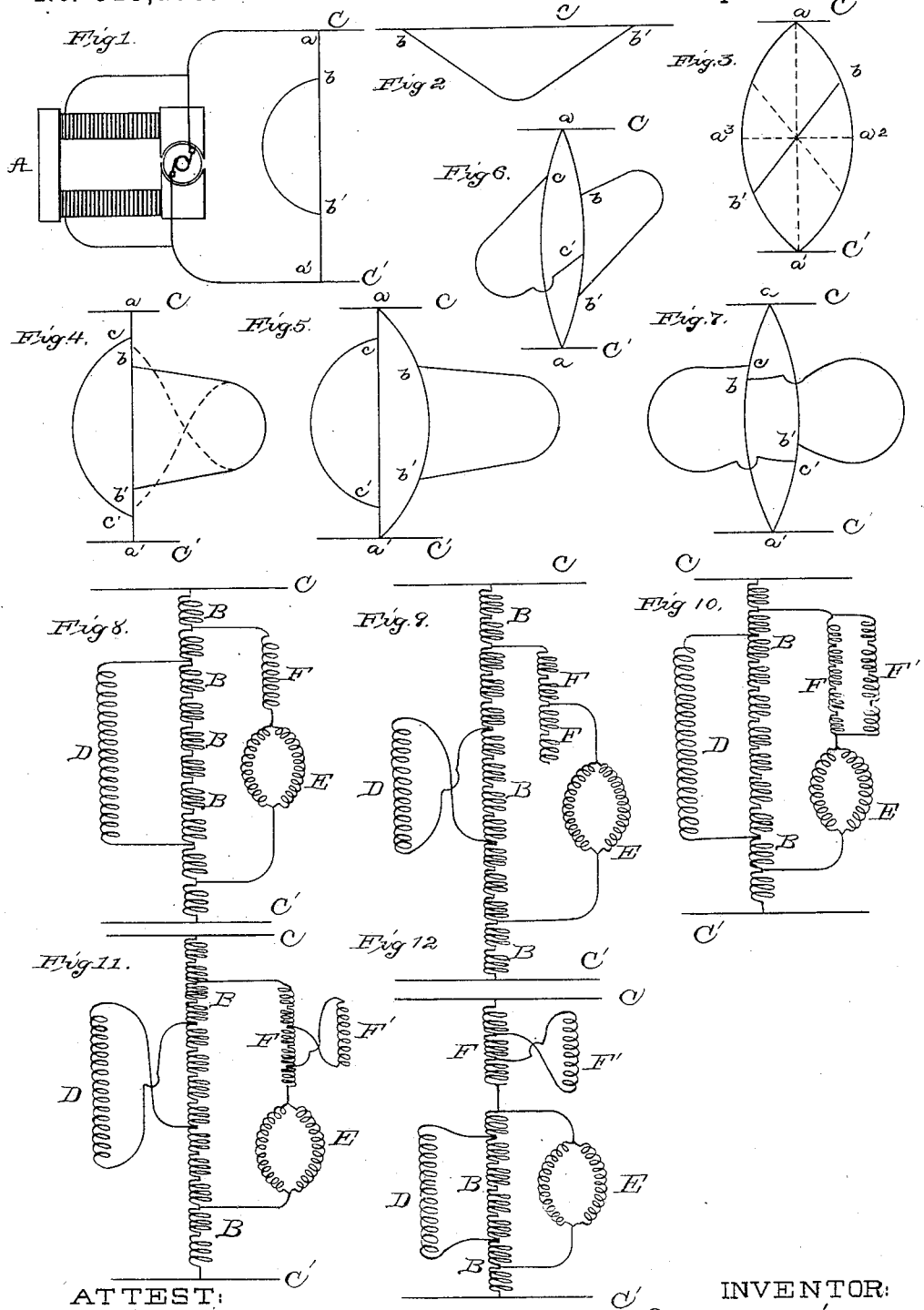
ATTEST:
E. Rowland
T. G. Greene Jr.
INVENTOR:
Frank J. Sprague
By Dyer & Seely
Attys (No Model.) 3 Sheets—Sheet 2.
F. J. SPRAGUE.
ELECTRO DYNAMIC MOTOR.

No. 315,179. Patented Apr. 7, 1885.

Witnesses:
Norris A. Clark
Richard C. Laurie

Inventor:
Frank J. Sprague
By Dyer & Seely
attys (No Model.) 3 Sheets—Sheet 3.

F. J. SPRAGUE.
ELECTRO DYNAMIC MOTOR.

No. 315,179. Patented Apr. 7, 1885.

Witnesses:
Norris A. Clark.
Richard C. Laurie

Inventor:
Frank J. Sprague
By Dyer & Seely
Attys

UNITED STATES PATENT OFFICE.

FRANK J. SPRAGUE, OF NEW YORK, N. Y.

ELECTRO-DYNAMIC MOTOR.

SPECIFICATION forming part of Letters Patent No. 315,179, dated April 7, 1885.

Application filed April 30, 1884. (No model.)

*To all whom it may concern:*

Be it known that I, FRANK J. SPRAGUE, of New York, in the county and State of New York, have invented a certain new and useful Improvement in Electro-Dynamic Motors, of which the following is a specification.

This invention relates to the regulation of electro-dynamic motors, and has for its object the providing of a complete system of regulation, whereby the power developed at any given speed or the speed at any given power may be varied either automatically or by hand and with the greatest readiness and precision, the speed may be maintained constant under varying loads, and the commutator-brushes may be automatically maintained at the non-sparking points.

In my application Serial No. 121,487 I have shown that with any given potential at the armature-terminals a constant speed may be maintained under varying loads by varying the strength of the field inversely with the variations in load, so that when the load diminishes the counter electro-motive force is increased, whereby the speed remains the same, and vice versa. By similar variations in the field, also, the motor was made to develop the same power per unit of time at different speeds.

A portion of my present invention relates to a method of regulating the field of the motor for the purpose just mentioned.

In my Patent No. 295,454 is shown the motor-armature shunted around a variable number of field-coils, the armature-current being varied by shifting its terminals along the variable field-coils.

My arrangement for regulating the field is similar in principle to this. I employ an additional series of field-coils shunted around the sectional field-coils, and having means for varying the number of field-coils around which it is shunted, it remaining in series with the rest. It is evident that if the potential in the mains remains of the same polarity the magnetic effect due to the variably-shunted coil will vary, being cumulative, nil, or differential, according to the position of the terminals of said coil, and it is further evident that by shifting such terminals the free magnetism of the core can be varied from the maximum practical saturation to nothing, or can be reversed, and this in a perfectly progressive manner. Thus the strength of the field may be regulated or varied to any desired extent, and with great readiness and nicety, and since the energy expended in the field, if it is properly wound and constructed, is a very small part of the whole amount used, this method of regulation is a very economical one. By the use of automatic mechanism to shift the terminals of the shunted coils the speed of the motor may be kept practically constant under varying loads. It is evident that this method of regulating strength of field is applicable also to dynamo-electric generators. A combination in a motor of this method of field-regulation with means for varying the potential at the armature-terminals, preferably such as described in my patent above referred to, gives a remarkably wide range of operation. Both the shunted field-coil and the armature may be regulated by the same commutator, or different commutators may be used; also, the armature and shunted field-coil may each be operated upon a different range of sectional field-coils.

Another part of my invention relates to the use as an additional means of regulation of a field-coil wound to oppose the main field-coils, which is placed in series with the armature, the latter being preferably, but not necessarily, shunted upon sectional field-coils. The differential coil is preferably of low resistance and few turns, and it may have reversible terminals, so that it can be made a differential coil still, if the armature-current is reversed. To explain the operation of this, it may be considered when used as the only means of field-regulation without the variably-shunted field-coil. With given initial and armature potentials, number of turns, &c., there will be a direct magnetic effect, due to the regular or sectional field-coils, which may be expressed by the ampères flowing in such coils multiplied by the number of turns, and there will be a negative effect produced by the armature field-coils, which may be expressed by the ampères flowing through the armature multiplied by the number of turns in said coils. This gives a differential field, which may be expressed by the difference in number of ampère-turns of these two factors. Suppose the load upon the armature under which it is running at some particular speed to be diminished. The armature will increase its speed slightly, the counter electro-motive force will be increased, and the current flowing in the armature and in its field-coil will be diminished. This, however, immediately decreases the negative effect of the differential coil, and the positive or direct field becomes more predominant, the field is strengthened, and the counter electro-motive force is increased, which further diminishes the armature-current and the negative effect of the field-coil, and so on—that is, the regulating influence thus employed to govern the motor and prevent its racing is cumulative, being set in action by a slight increase in speed, and augmented by an increased field due to the diminished influence of the differential coil, whose influence depends upon the armature-current. Oppositely, a slight decrease in speed, causing a diminished counter electro-motive force, increases the effect of the differential coil and diminishes the field. With the motor running free this coil will become practically dead and its influence nothing; but it is ready to automatically come into action the instant any load is placed on the motor.

It will be seen that with a motor running at a high efficiency the change in speed, provided the mass of iron in the core is sufficiently quick in changing its magnetic state with a change in current, need be very slight. The differential coil may, however, be placed outside the terminals of the armature and main field-shunts. In this case it is of course still in series with the armature. A motor so arranged is preferably used on a circuit of constant difference of potential, because in a circuit of constant current the motor must work at less than fifty per cent. armature efficiency, which is uneconomical, and therefore commercially impractical. On the two kinds of circuits the action of the motor is totally different. On a constant potential circuit the drop in potential between the line-terminal and the terminals of the armature and main field-shunts, where the series-coil is situated, varies with the load on the motor, and the differential effect of said series-coil therefore varies with the load, while in the constant-current circuit the current in the series-coil so situated is constant, and so its differential effect is not varied, and the motor will not regulate, except, as stated, when working at less than fifty per cent. efficiency; but the differential coil can be used as the sole means of regulation only in motors constructed for particular work and speed, for the two sets of coils must be properly proportioned in constructing the machine to enable them to produce all the different effects, from the maximum to the minimum of field strength, which must be obtained in practice.

To apply the principle to a general system of regulation of power and speed of a motor to meet the various conditions which occur in practice, both mechanical and electrical, I prefer to combine it with the independent coil shunted around more or less of the sectional coils, which is set forth above. Preferably I have also means for varying the armature-current. Having these methods of field-regulation combined, I can adjust the field by means of the shunted coil to the particular work which the motor has to do at any time. The armature field-coil will then act while the motor is running to regulate for any changes which occur.

As I have suggested, the magnetic effect of the field-coils on the cores may be expressed by "ampère-turns." For a certain range of variation the magnetic field will be proportional to the ampère-turns; but this law will not hold when the iron approaches saturation; consequently a given ratio of increase of ampère-turns will not always give the same ratio of increase in counter electro-motive force for all given initial speeds, and more particularly will not a given numerical increase of ampère-turns give the same ratio of increase in counter electro-motive force at different speeds; also, the ratio of increase of counter electro-motive force from maximum to minimum load depends upon the determined ratio with the initial electro-motive force of which the counter electro-motive force shall for the time be considered the normal, which, other conditions being equal, depends on the load.

As I have shown, the use of an independent differential field-coil enables me to use any desired number of effective ampère-turns for the field; hence if I use a differential coil in the armature-circuit I prefer to have means for varying its influence. This may be done by cutting out more or less of the turns, or by shunting more or less of them into parallel circuit with each other. Preferably, however, I divide them into two sets, one being sectional, and the other having its terminals adjustable upon the sections, precisely as hereinbefore described for the main field-coils.

The differential armature field-coil may be used in connection with any automatic means for accomplishing the other described regulations.

By the foregoing arrangements and combinations I have the most absolute and positive control of an electric motor as regards speed and power, and in hand or automatic regulation up to the mechanical limit of its construction and the electrical capacity of the circuit. For the complete regulation of a motor, however, one more element is required—viz., the automatic adjustment of the commutator-brushes to the non-sparking points of the commutator-cylinder. A portion of my invention consists in the providing of means for this purpose.

I am aware that many different devices have been proposed for shifting automatically the brushes of a dynamo electric generator for different purposes. No one of these, however, is adapted for use with an electro-dynamic motor. One proposed method is to keep the brushes at such points as will give a constant potential with a varying load, as in some incandescent electric-light circuits. This does not keep them at the non-sparking points. Another is to differentiate the action of three or more armature-coils to maintain a constant current. This does not prevent sparking. A third proposes the use of one or more accessory brushes and regulating apparatus in the circuit between the accessory and the main collecting-brushes. Such apparatus would equate the potentials at the main and the accessory brushes, and would not keep either at the true non-sparking point. Another method makes the movement of the brushes depend upon the armature-current to give a positive lead in the direction of rotation. In this connection I wish to point out the marked difference between the action of generators as ordinarily wound with continuous armature-windings of the Pacinotti or Alteneck systems and motors similarly wound, and such as will be used in practice.

Dynamos may be generally classed as series or shunt machines. In both, if the speed is increased with a fixed external resistance, the field and the electro-motive force are both increased, and the brushes must be given an increased lead in the direction of rotation.

In a machine for incandescent lighting, generally excited on the shunt system, a decrease of external resistance is attended with an increase of current, and a lead is given to the brushes in the direction of rotation. All methods of automatic regulation of brushes on this principle with which I am acquainted depend for the positive movement upon the current in the armature, which is the total current in the circuit. Two distinct influences, however, determine the proper position for the brushes, and these influences are differential. With any given field the displacement is fairly proportional to the current in the armature. With a given armature-current and displacement, if the strength of the field is increased, the displacement is diminished. Now, in a dynamo the variations in the strength of the armature-current and of the field are of the same character, both being increased or both being diminished by the same causes, though not necessarily in the same ratio.

In a motor designed to run at any given speed with varying loads, and regulated in any way by the field, the armature-current and the strength of the field must vary inversely, and whatever the lead given to the brushes it is a negative one.

I do not take into consideration motors having their fields and armatures in series, since in such motors an increase in speed or a decrease in current diminishes the field, and consequently further increases the speed and diminishes the current.

A further distinction between generators and motors is that in the generator the direction of the current in the field is opposed to that in the armature—in the armature the current flowing toward what is ordinarily termed the "positive brush," and in the field away from it—while if the machine is used as a motor to run in the same direction, the direction of the current in the field may remain the same, while that in the armature is reversed, which of course reverses the polarity of the armature. In the dynamo the field is properly a part of the external circuit, and after polarization there can be no reversal of a self-excited dynamo except by a reversal of the direction of rotation and shifting of the field-terminals, and such reversal of direction would reverse the lead of the brushes and shift the non-sparking point to the opposite side of the middle position. In a motor with shunt or series field the polarity of the brushes can be changed at will, while the direction of rotation and the lead of the brushes is unchanged. If a dynamo with an electro-magnetic device for shifting the brushes be used as a motor to run in the same direction, the action of the shifting device will cause the brushes to spark badly, and the entire reversal of its action would be necessary.

From the above it will be seen that no automatic apparatus which has been used to shift the brushes of a dynamo to the non-sparking point can be employed for the same purpose with an electro-dynamic motor.

In a motor in which the field-magnet is normally not regulated it will be possible to regulate the brushes by a device dependent on the armature-current alone, and for such motors the regulation is preferably performed in this way; but I desire in many cases to employ motors capable of being run at different standard speeds by varying the field, and hence I wish to make my brush-regulating apparatus a differential one—such that if the field is strengthened the negative lead of the brushes will be diminished.

I have devised several different ways of operating on this principle; but most of these will be set forth in another application for Letters Patent, in which I shall make claim to my method of brush-regulation for motors.

In a complete motor I prefer to employ all the regulating devices above described, and all operating automatically—that is to say, the sectional field-coils on which an independent field-coil is variably shunted, the armature also variably shunted around the same or other field-coils, the differential field-coil in series with the armature and having means, as described, for varying its effect, (such means, however, I prefer to operate by hand,) and a suitable brush-shifting device. Each of these, if used alone, has a certain useful effect; but, as I have said, their combination produces a most precise, complete, and reliable system of regulation.

Figure 14:
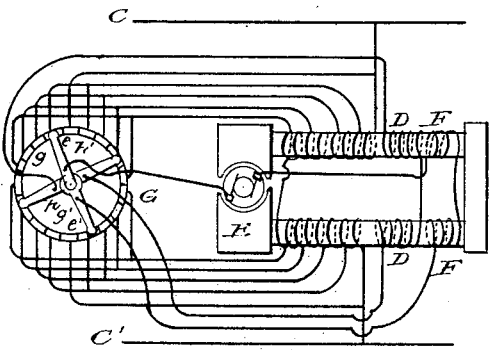
Figure 15:
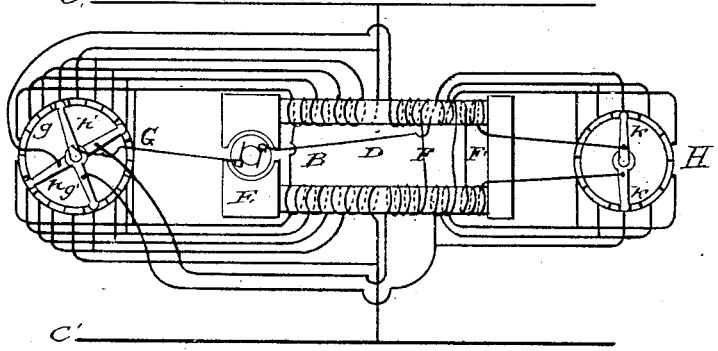
Figure 16:
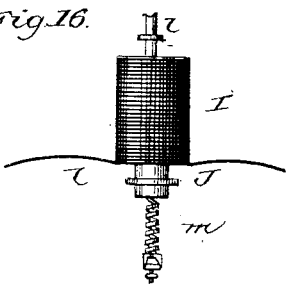
Figure 17:
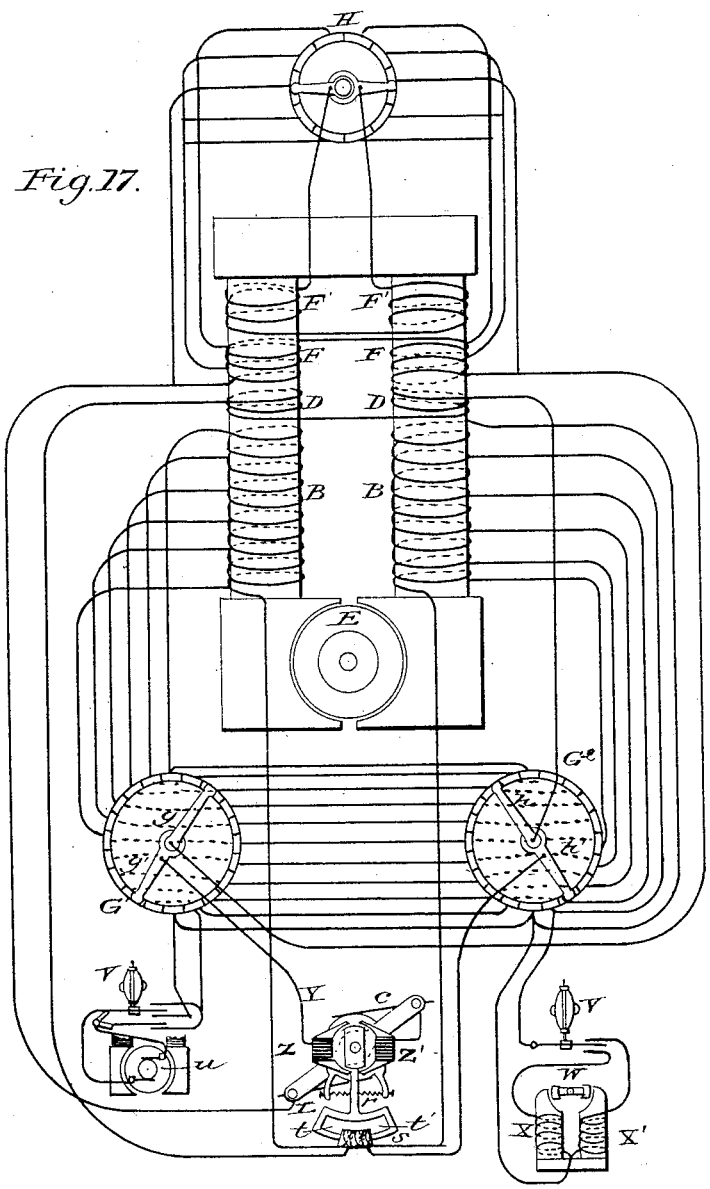

In the accompanying drawings, Figures 1, 2, and 3 are diagrams illustrating the simple principle of changing the current in a shunt by moving its terminals upon the conductor from which it is shunted. Fig. 4 is a diagram illustrating the independent field-coil variably shunted around the sectional coils. Fig. 5 illustrates the independent coil shunted upon a range of sectional coils and the armature upon a continuous field-coil. Fig. 6 shows two sectional ranges with the independent coil variably shunted on one and the armature variably shunted between the two. Fig. 7 shows both the armature and the independent coil variably shunted between the two sectional ranges. Fig. 8 illustrates the variably-shunted armature and independent coil and the differential coil in series with the armature. Fig. 9 illustrates the same with the terminals of the independent shunted coil reversed to give a differential action. Fig. 10 is the same as Fig. 8, with the armature field-coil provided with a variably-shunted coil for varying its effect. Fig. 11 is the same with the said variably-shunted coil reversed. Fig. 12 shows the differential coil in series with the armature outside the terminals of the armature-shunt. Fig. 13 represents a motor having its armature and independent field-coil variably shunted upon the sectional field by the same commutator. Fig. 14 represents the same provided also with a field-coil in series with the armature; Fig. 15, the same, said armature field-coil having a shunted coil and a commutator for varying its effect. Fig. 16 shows an automatic device, whereby changes in the armature-current may be made to change the position of the terminals of the variably-shunted field-coil; and Fig. 17 is a view of the motor provided with all the various regulating devices described, including the brush-shifting device.

In Fig. 1, A represents any suitable source of electric energy, from which one or more motors, or a system of motors, lamps, &c., are supplied. C C' are main conductors.

A derived circuit from the main is represented by $a\, a'$, and $b\, b'$ is a shunt therefrom.

In Fig. 2, shunt $b\, b'$ is taken directly from main C. It is evident that by moving the terminals $b\, b'$ toward or away from each other the current in the shunt may be changed, and on such terminals passing one another the current will be reversed.

In Fig. 3 the shunt $b\, b'$ is between two cross-circuits, $a\, a^2\, a'$ and $a\, a^3\, a'$. If $b\, b'$ has the dotted position $a\, a'$, its maximum current will flow. If it is brought to position $b\, b'$, the current is diminished, and when at $a^2\, a^3$ no current will flow. Beyond this position the current is reversed and continues to increase, the maximum reversed current flowing at $a'\, a$. These arrangements are fully set forth in my Patent No. 295,454.

In Fig. 4, let $a\, a'$ represent a motor field-circuit including sectionally-wound coils. $c\, c'$ is the armature-shunt, and $b\, b'$ is an independent field-coil with movable terminals. As shown in full lines, this coil assists the main field-coils.

The dotted lines represent it reversed and acting as a differential coil.

In Fig. 5 the armature-shunt $c\, c'$ is upon one range of field-coils and the independent field upon another.

In Fig. 6 the armature-shunt $c\, c'$ is between two sectional ranges of the field, the arrangement being that illustrated in Fig. 3. The independent field is shunted upon one range.

In Fig. 7 both the armature and independent field are shunted between two sectional ranges.

In Fig. 8, B B are sections of main field-coils. D is an independent series of field-coils variably shunted upon the sections. E is the armature, also in a variable shunt, and F is an oppositely-wound field-coil in series with the armature. In this figure coils B and D act in the same direction and are opposed by coil F, whose effect varies with the armature-current, as has been already explained.

In Fig. 9 the terminals of coils D have been reversed, and such coils oppose the main coils. A portion of the differential coil F is cut out of circuit to change its action, the motor being thus set for a different standard or normal speed.

In Fig. 10 the differential coil F is wound in sections, and a coil, F', is shunted upon it with movable terminals, so that its influence can be increased, diminished, or reversed to change the effect of the differential coil.

Fig. 11 shows the coil F' reversed, as well as coil D.

In Fig. 12 the differential coil F F' is placed in the direct motor-circuit, instead of within the armature-shunt. It is still, however, in series with the armature. The effect has been already explained.

In Fig. 13, G is a circular commutator, having contacts $e\, e'$, &c. Connections from the two ranges of sectional main field-coils B B of the motor are made to these blocks in the manner set forth in my patent above referred to—that is, the first connection, or one nearest main C, is joined to one block, $e$, and the last one is connected to the opposite block, $e'$. The second connection, $f$, is joined to two blocks, $e^2\, e^2$, on either side of $e$. Likewise, the next to last connection, $f'$, is joined to two blocks, $e^3\, e^3$, the third connection to two blocks, $e^4\, e^4$, and so on until the blocks meet on either side. The commutator has two pairs of contact-arms, $g\, g'$ and $h\, h'$. The armature-terminals are connected to arms $g\, g'$, and the terminals of independent field-coils D to arms $h\, h'$. The rotation of a pair of these arms shunts the circuit with which they are connected around a greater or less number of coils B, or reverses such circuit. Thus the current in the armature or the strength of the field is regulated, as hereinbefore explained.

In Fig. 14 the differential field-coil F is shown in series with the armature, the figure being otherwise the same as Fig. 13.

In Fig. 15 the differential coil has means for regulating its effect. An extra coil, F', is used, the coils F being wound sectionally and the sections connected to commutator H in the manner described with reference to Fig. 13. The contact arms $k\ k$ are connected with coil F', and by moving such arms the current in said coil may be varied or reversed, so as to make it a differential coil.

Fig. 16 illustrates an automatic device for varying the field. A solenoid, I, placed in the armature-circuit has a movable core, J, which has any suitable mechanical connection (not shown) with the terminal arms of the adjustable independent field-coil, so that such terminals are moved by variations in the armature-current. The core is provided with two adjustable stops, $t\ t$, and with an adjustable retracting-spring, $m$. When the motor is placed in circuit for certain work, the spring and stops are adjusted for the current used and the desired normal speed. An increase in the speed of the motor gives an increased counter electro-motive force, causing a decrease in the armature-current, and allows spring $m$ to act, and the core moves the independent field-coil terminals so as to strengthen the field and reduce the speed again. This makes a cumulative action, as the increased field again increases the counter electro-motive force. Thus a very slight increase of speed acts upon the field as in the case of the differential coil in series with the armature.

Fig. 17 shows a motor embodying all the different field-regulating devices above set forth, as well as differentially-controlled automatic brush-shifting apparatus. In this figure the different parts of the current-regulating apparatus are shown separated and in diagram, and the commutator of the motor is for clearness separated from the armature and field-magnet.

By means of commutator G', the connections to which are made in the manner already explained, the armature is shunted upon a greater or less number of main field-coils B. By commutator $G^2$ the independent field-coils D are variably shunted around coils B.

It has been already shown that both these operations may be performed by the same commutator. By commutator H extra coil F' is shunted upon more or less of the differential coil F, which is in series with the armature.

Automatic devices are shown for operating the arms on the commutators G' or $G^2$.

For controlling commutator G' is shown a small electric motor, of which $u$ is the armature. A centrifugal governor, V, upon or connected with the shaft of the regulated motor closes circuit by its movements to motor $u$ in one direction or the other, according to variations in speed, and armature $u$, being connected in any suitable manner with the pivoted arms on commutator G', moves the same in the proper direction.

For commutator $G^2$ is shown a polarized armature, $w$, centrally pivoted between the curved pole-pieces of magnets $x\ x'$. By means of centrifugal governors $v$, operated as just explained, circuit is closed through $x$ or $x'$, and the pivoted armature is drawn one way or the other. It is suitably connected with the commutator-arms and draws them in one way or the other to shift the terminals of the independent field-coil. These automatic devices are shown for illustration merely, it being evident that many other similar arrangements may be readily employed, and that two similar or different automatic devices may be employed to shift the armature and independent field terminals when they are on the same commutator. The automatic brush-shifting apparatus shown in this figure is one in series with the armature, and included also in the circuits of the main field-coils and of the independent variably-shunted field-coils, so that its action is dependent upon the currents in all these circuits. This apparatus operates equally well no matter in which direction the current is sent through the motor. A centrally-pivoted arm, L, carries the commutator-brushes $n\ n$, which bear on the commutator K. Upon the arm L is a polarized armature, Y, situated between two curved pole-magnets, Z Z', the coils of both of which are in the armature-circuit. When the armature-current is in one direction, armature Y moves toward Z, and when in the other direction toward Z'. An arm, $r$, extends below the armature Y, and carries the core $s$, upon which are wound the coils $t$ and $t'$, included one set in circuit of the main or sectional field-coils B, the other in the circuit of the independent variably-shunted field-coils D. These field-circuit coils $t\ t'$ tend to hold the polarized armature Y centrally; but armature-circuit coils Z and Z' tend to move it in one direction or the other. The coil $t$ will be omitted in a motor having a simple field-circuit provided with a current-regulating device, and then the position of the brushes depends upon variations in the main field strength and in the armature-current. If the field is strengthened, the coil in the main field-circuit acts to diminish the negative lead of the brushes for the increased counter electro-motive force and decreased speed occasioned by the strengthening of the field, and a diminution of the armature-current has a like effect upon the brushes, for the coil $t'$ opposes either the coil Z or Z'. The influence of coil $t$, in the independent field-coil circuit is changed as its terminals are changed to regulate the field, and it opposes the influence either of the armature or the main field-current, as the case may be. This apparatus acts the same no matter in which direction the current is sent through the motor, the lead given to the brushes being in the right direction in whichever direction the current may be.

I do not claim herein varying the relative number of effective ampère-turns in the regular and differential field-coils, since this is claimed in my application, Serial No. 134,321, filed June 9, 1884; and I do not claim herein the method of regulation for the commutator-brushes of electro-dynamic motors herein described, since this also will form the subject of another application.

What I claim is—

1. In an electric motor or generator, a field-magnet having sectional coils and other coils in a shunt around a variable number of the sections and independent of the armature-circuit, in combination with means for varying the number of sections around which said independent coils are shunted, substantially as set forth.

2. In an electric motor or generator, a field-magnet having sectional coils and other coils in a shunt around a variable number of the sections and independent of the armature-circuit, in combination with means for varying the number of sections around which the independent coils are shunted, and means for reversing the current in said independent coils, substantially as set forth.

3. In an electro-dynamic motor, the combination of sectional field-magnet coils, other field-magnet coils in a shunt around a variable number of such sections, means for varying the number of sections around which the latter coils are shunted, and means for varying the armature-current, substantially as set forth.

4. In an electro-dynamic motor, the combination of sectional field-magnet coils, independent field-magnet coils in a shunt around a variable number of such sections, the armature in a shunt around a variable number of such sections, means for varying the number of sections around which the independent coils are shunted, and means for varying the number of sections around which the armature is shunted, substantially as set forth.

5. In an electro-dynamic motor, the combination, with sectional field-magnet coils, of other field-magnet coils in a shunt around a variable number of such sections, the armature in a similar shunt, means for varying the number of sections around which the other coils are shunted, means for reversing the current in said other coils, means for varying the number of sections around which the armature is shunted, and means for reversing the armature-current, substantially as set forth.

6. In an electro-dynamic motor, the combination of main field-magnet coils, differential field-magnet coils in series with the armature, and means for varying the potential existing at the armature-terminals, substantially as set forth.

7. In an electro-dynamic motor, the combination of the armature in a shunt around a variable number of field-coils and differential field-coils in series with the armature, substantially as set forth.

8. In an electro-dynamic motor, the combination of main field-magnet coils in shunt relation to the armature, provided with means for varying their magnetizing effect, and differential field-magnet coils in series with the armature, substantially as set forth.

9. In an electro-dynamic motor, the combination of sectional field-magnet coils, independent field-magnet coils in a shunt around a variable number of the sections, means for varying the number of sections around which said independent coils are shunted, and differential field-coils in series with the armature, substantially as set forth.

10. In an electro-dynamic motor, the combination of sectional field-magnet coils, independent field-magnet coils in a shunt around a variable number of the sections, the armature in a similar shunt, means for varying the number of sections around which said independent coils are shunted, means acting similarly upon the armature-shunt, and differential field-coils in series with the armature, substantially as set forth.

11. In an electro-dynamic motor, the combination of main field-magnet coils in shunt relation to the armature, differential field-magnet coils in series with the armature, and means for varying the magnetizing effect of the said differential coils, substantially as set forth.

12. In an electro dynamic motor, differential field-coils in series with the armature, wound partly in sections, and having extra coils in a shunt around a variable number of such sections, substantially as set forth.

13. In an electro-dynamic motor, differential field-coils in series with the armature, wound partly in sections, and having extra coils in a shunt around a variable number of such sections, in combination with means for varying the number of sections around which said extra coils are shunted, and means for reversing the current in said extra coils, substantially as set forth.

14. In an electro-dynamic motor, the combination of main field-magnet coils having means for varying their magnetizing effect, and differential field-magnet coils in series, with the armature having means for varying their magnetizing effect, substantially as set forth.

15. In an electro-dynamic motor, the combination of main field-magnet coils having means for varying their magnetizing effect, means for varying the armature-current, and differential field-magnet coils in series, with the armature provided with means for varying their magnetizing effect, substantially as set forth.

16. In apparatus for regulating an electro-dynamic motor, the combination, with sectional field-coils and independent field-coils in a shunt around a variable number of the sections, of means acting automatically upon variations in speed of the motor for varying the number of sections around which said independent coils are shunted, substantially as set forth.

17. In apparatus for regulating electro-dynamic motors, the combination, with sectional field-coils, of independent field-coils in a shunt around a variable number of such sections, the armature in a similar shunt, means acting automatically upon variations in speed of the motor to vary the number of sections around which said independent coils are shunted, and antomatic means acting similarly upon the armature-shunt, substantially as set forth.

18. The combination, with an electro-dynamic motor having main field-coils and differential field-coils in series with the armature, of an electro-magnetic device in series with the armature for automatically maintaining the commutator-brushes at the points of least spark, substantially as set forth.

19. The combination, with an electro-dynamic motor, of an electro-magnetic device for automatically maintaining the commutator-brushes at the points of least spark included both in the armature and the main field circuits, substantially as set forth.

20. The combination, with an electro-dynamic motor having main field-magnet coils and independent variable field-magnet coils, of an electro magnetic device in the circuit of said independent coils for automatically maintaining the commutator-brushes at the points of least spark, substantially as set forth.

21. The combination, with an electro-dynamic motor having main field-coils and independent variable field-coils, of an electro-magnetic device included both in the armature-circuit and in the circuit of said independent coils for automatically adjusting the commutator-brushes to the points of least spark, substantially as set forth.

22. An electro-magnetic device for maintaining the commutator-brushes of an electro-dynamic motor at the non-sparking points included in the armature-circuit, the circuit of the main field-coils, and the circuit of the cumulative or differential independent field-coils, substantially as set forth.

23. The combination, with movable commutator-brushes of an electro-dynamic motor, of two electro-magnets in the armature-circuit acting oppositely upon the brushes, substantially as set forth.

24. The combination, with the movable commutator-brushes of an electro-dynamic motor, of two electro-magnets in the armature-circuit acting oppositely upon said brushes, and an electro-magnetic device in the one or more field-circuits opposing both said armature electro-magnets, substantially as set forth.

25. In an electro-dynamic motor, the combination of sectional field-coils, electrical connections from the junctions of the sections to contact-blocks, and two arms in electrical contact with said blocks and forming terminals of a circuit including other or independent field-coils, substantiallly as set forth.

26. The combination of sectional field-magnet coils, a circular commutator, two movable arms bearing on said commutator and forming terminals of a shunt-circuit including other independent field-coils, and connections from the junctions of said sectional coils to the plates of said commutator, whereby the current in the shunt is varied and reversed by the movement of said arms, substantially as set forth.

27. The combination of sectional field-magnet coils of an electro-dynamic motor, a circular commutator, two pairs of movable arms bearing on said commutator, one pair forming terminals of a shunt-circuit including the armature, the other forming terminals of a shunt-circuit including other or independent field-coils, and connections from the junctions of said sectional coils, whereby the armature-current is varied and reversed by the movement of one pair of arms, and the independent field-coil current is similarly affected by the other pair, substantially as set forth.

28. The combination, with a circuit of a constant difference of potential, of an electro-dynamic motor connected therewith, having main field-magnet coils in shunt relation to its armature and differential field-magnet coils in series with the armature and outside the terminals of the armature and main field-shunts, substantially as set forth.

This specification signed and witnessed this 23d day of April, 1884.

FRANK J. SPRAGUE.

Witnesses:
H. W. SEELY,
T. G. GREENE, Jr.

It is hereby certified that in Letters Patent No. 315,179, granted April 7, 1885, upon the application of Frank J. Sprague, of New York, New York, for an improvement in "Electro-Dynamic Motors," certain errors appear in the printed specification requiring correction, as follows: In the 4th line of the 14th claim, and 5th line of the 15th claim, the comma after the word "series" should be omitted.

And it is certified that the proper corrections have been made in the files and records pertaining to the case in the Patent Office, and should be read in said Letters Patent to make the same conform thereto.

Signed, countersigned, and sealed this 19th day of May, A. D. 1885.

[SEAL.]

H. L. MULDROW,
*Acting Secretary of the Interior.*

Countersigned:
   M. V. MONTGOMERY,
      *Commissioner of Patents.*